US010693979B2

(12) United States Patent
Knecht (10) Patent No.: US 10,693,979 B2
(45) Date of Patent: *Jun. 23, 2020

(54) THIRD PARTY VALIDATION OF WEB CONTENT

(71) Applicant: CLOUDFLARE, INC., San Francisco, CA (US)

(72) Inventor: Dane Orion Knecht, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 275 days.

This patent is subject to a terminal disclaimer.

(21) Appl. No.: 15/920,298

(22) Filed: Mar. 13, 2018

(65) Prior Publication Data
US 2018/0219960 A1 Aug. 2, 2018

Related U.S. Application Data

(63) Continuation of application No. 15/420,080, filed on Jan. 30, 2017, now Pat. No. 9,917,908.

(51) Int. Cl.
*H04L 29/08* (2006.01)
*H04L 29/06* (2006.01)
(Continued)

(52) U.S. Cl.
CPC ............ *H04L 67/20* (2013.01); *G06F 21/645* (2013.01); *H04L 9/3247* (2013.01); *H04L 63/0245* (2013.01); *H04L 63/126* (2013.01); *H04L 63/145* (2013.01); *H04L 67/02* (2013.01); *H04L 67/2842* (2013.01)

(58) Field of Classification Search
CPC . G06F 21/645; H04L 63/0245; H04L 63/126; H04L 63/145
See application file for complete search history.

(56) References Cited

U.S. PATENT DOCUMENTS

2009/0222329 A1 9/2009 Ramer et al.
2009/0234711 A1 9/2009 Ramer et al.
(Continued)

OTHER PUBLICATIONS

AMP Ads for AMP Pages ("a4a") #3133, ampproject/amphtml—GitHub, © 2017 GitHub Inc., May 6, 2016, 5 pages, downloaded from https://github.com/ampproject/amphtml/issues/3133.
(Continued)

*Primary Examiner* — Ranodhi Serrao
(74) *Attorney, Agent, or Firm* — Nicholson De Vos Webster & Elliott LLP (57) ABSTRACT

A first server receives, from a client network application, a request for a network resource. The first server retrieves the requested network resource, where the requested network resource is handled by a second server that is different than the first server. The first server validates whether at least a portion of the retrieved network resource conforms to a set of one or more rules. If it does, the first server cryptographically signs the at least portion of the retrieved network resource thereby creating a digital signature. The first server transmits a response to the client network application that includes the at least the portion of the retrieved network resource and the digital signature. The client network application is configured to validate the first digital signature that validates that the portion of the network resource conforms to the set of rules.

15 Claims, 3 Drawing Sheets

(51) Int. Cl.
*H04L 9/32* (2006.01)
*G06F 21/64* (2013.01)

(56) References Cited

U.S. PATENT DOCUMENTS

| | | |
|---|---|---|
| 2009/0234861 A1 | 9/2009 | Ramer et al. |
| 2009/0240568 A1 | 9/2009 | Ramer et al. |
| 2009/0240569 A1 | 9/2009 | Ramer et al. |
| 2009/0240586 A1 | 9/2009 | Ramer et al. |
| 2010/0063877 A1 | 3/2010 | Soroca et al. |
| 2010/0076994 A1 | 3/2010 | Soroca et al. |
| 2010/0094878 A1 | 4/2010 | Soroca et al. |
| 2011/0258049 A1 | 10/2011 | Ramer et al. |

OTHER PUBLICATIONS

AMP HTML, amphtml/README.md at master—ampproject/amphtml—GitHub, © 2017 GitHub Inc., 2 pages, downloaded from https://github.com/ampproject/amphtml/blob/master/README.md.

AMP HTML Validator, amphtml/README.md at master—ampproject/amphtml—GitHub, © 2017 GitHub Inc., Aug. 2, 2016, 2 pages, downloaded from https://github.com/ampproject/amphtml/blob/master/validator/README.md.

Changes to implement A4A (AMP ads for AMP pages) #3534, ampproject/amphtml—GitHub, © 2017 GitHub Inc., Jun. 30, 2016, 17 pages, downloaded from https://github.com/ampproject/amphtml/pull/3534.

Infrastructure for dynamically loading A4A validation keys #5091, ampproject/amphtml—GitHub, © 2017 GitHub Inc., Oct. 3, 2016, 9 pages, downloaded from https://github.com/ampproject/amphtml/pull/5091.

Intent to Implement: Format Specification and Validation Rules for A4A Ad Documents #4264, ampproject/amphtml—GitHub, © 2017 GitHub Inc., Jul. 28, 2016, 2 pages, downloaded from https://github.com/ampproject/amphtml/issues/4264.

Notice of Allowance from U.S. Appl. No. 15/420,080, dated May 22, 2017, 18 pages.

Notice of Allowance from U.S. Appl. No. 15/420,080, dated Nov. 8, 2017, 13 pages.

Ubl M., "But what about the ads?," Medium, Jul. 19, 2016, downloaded from https://medium.com/@cramforce/but-what-about-the-ads-bfe5025b6606, 8 pages.

THIRD PARTY VALIDATION OF WEB CONTENT

CROSS-REFERENCE TO RELATED APPLICATIONS

This application is a continuation of application Ser. No. 15/420,080, filed Jan. 30, 2017, which is hereby incorporated by reference.

FIELD

Embodiments of the invention relate to the field of network communications; and more specifically, to a third party validation of web content to a set of one or more rules.

BACKGROUND

Network resources, such as web pages, commonly include online advertisements that are served by advertisement servers that are different than the parent web page (sometimes referred to as the publisher web page). Advertisement creatives are written by many different companies with many different options. As a result, some advertisements cause page loading to be slow and non-performant.

AMP Ads for AMPHTML pages (A4A) is a way to render fast and performant ads in AMP pages. An AMP page is an HTML page that has certain restrictions and features in an attempt to speed up regular page loading. A4A advertisement creatives must obey a set of validation rules (with a limited set of allowed tags, capabilities, and extensions) in order to be rendered quickly and smoothly in the browser and do not degrade user experience.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for a third party validation of web content to a set of one or more rules is described. In an embodiment, a third party validates an advertisement (or other specific portion of content) to be placed on a web asset for conformance to a set of one or more rules. If the advertisement is validated as conforming to the set of rules, the third party signs the advertisement using a key. The key to verify the signature of the advertisement may be part of a client runtime that is included, either directly or indirectly, in the parent asset of the web asset. The client network application may then process the validated asset differently than if the asset was not validated as conforming to the set of rules.

In an embodiment, the set of rules may be defined so that the online advertisement can be rendered quickly by the client network without application degrading user experience. By way of example, the set of rules may specify one or more of the following: the tags that are allowed in the HTML and/or the tags that are not allowed in the HTML, capabilities that are allowed and/or not allowed in the HTML, extensions that are allowed and/or not allowed, whether the correct client-side script (the client runtime) is included, media preferences (e.g., video and audio must not be enabled for autoplay), and analytics preferences (e.g., viewability tracking may be limited to target only the full-ad selector). Validating that the website conforms to the set of rules may allow the client network application to trust that the online advertisement will render quickly without degrading the user experience and thus may render the online advertisement differently than it otherwise would.

In an embodiment, the set of rules may include a rule for analyzing the web asset for known issues such as if it may have been hacked and/or contain malware or other malicious content. The client network application may process a validated web asset differently. For example, the client network application may be configured to process or display only those network resources that have been deemed to conform to the set of rules. For those that do not conform to the set of rules, the client network application may present an error message that indicates that the network resource has not been verified and may be hacked and/or contain malware or other malicious content, with an option for the user to proceed anyway. The client network application may be configured to display a notification or other indicator (e.g., a checkmark) that indicates that the network resource has been determined not to be hacked and/or contain malware.

In an embodiment, the set of rules may include a rule for analyzing the web asset for adult content or other content not appropriate for children. A validated web asset may cause the client network application to behave differently. For instance, the client network application may be configured to process or display only those network resources that have been deemed to conform to the set of rules. For those that do not conform to the set of rules, the client network application may present an error message that indicates that the network resource may not be suitable for children. The client network application may be configured to display a notification or other indicator (e.g., a checkmark) that indicates that the network resource has been determined to be suitable for children.

Figure 1:
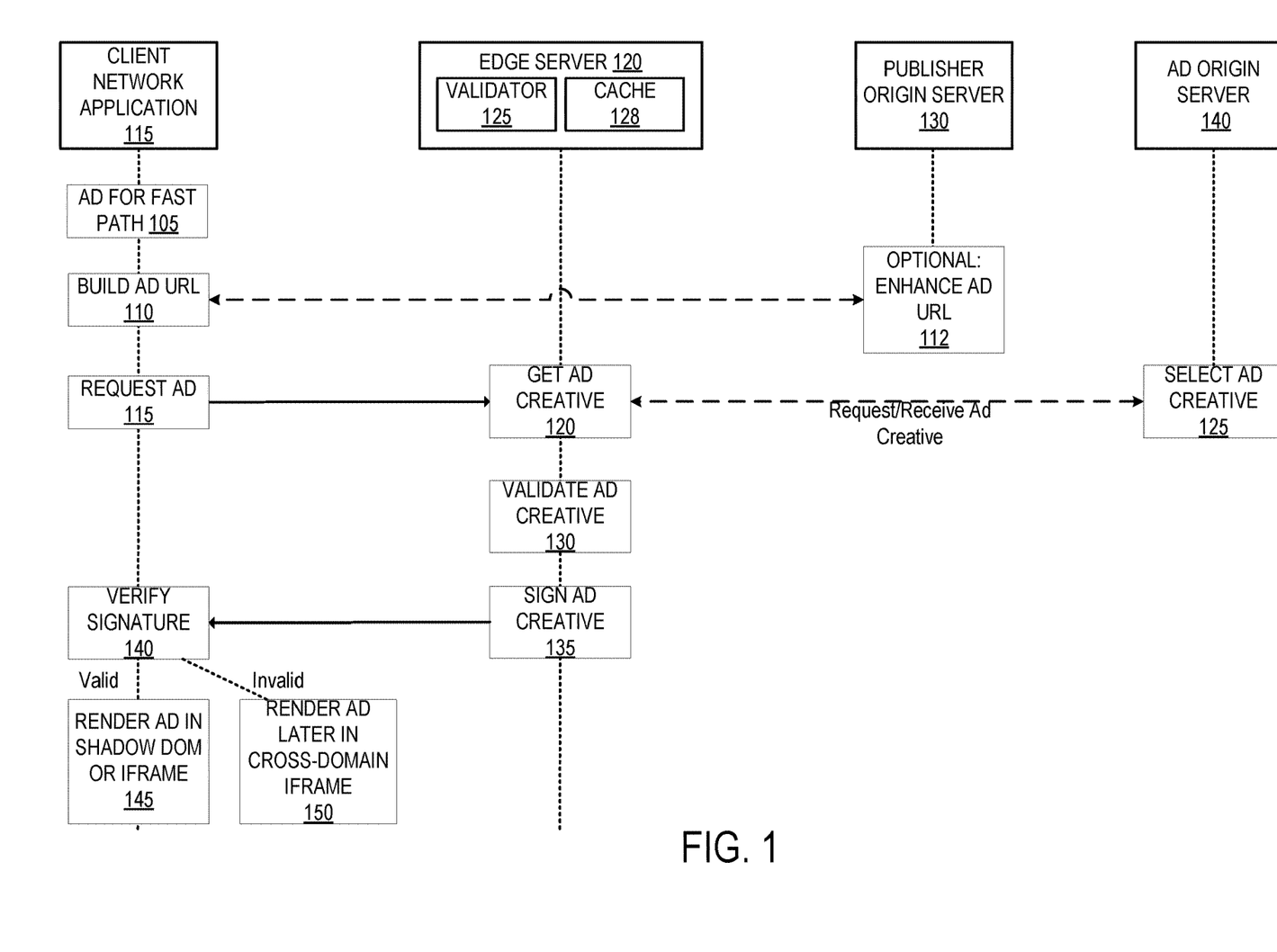
FIG. 1 is a sequence diagram that illustrates exemplary operations for third-party validation of an online advertisement creative, according to an embodiment.

In an embodiment, the validating and signing is performed by a third party edge server that may act as a node in a content delivery network. For instance, FIG. 1 is a sequence diagram that illustrates exemplary operations for third-party validation of an online advertisement creative, according to an embodiment. The operations of FIG. 1 are described with respect to online advertisement creatives, however it should be understood that aspects can be performed with respect to other types of network resources.

The system illustrated in FIG. 1 includes the client network application 115, the edge server 120, the publisher origin server 130, and the advertisement ("ad") origin server 140. The client network application 115 is executed by a client device (not illustrated) that is a computing device (e.g., laptops, workstations, smartphones, mobile phones, tablets, gaming systems, set top boxes, wearable devices, Internet of Things (IoT) devices, etc.) that are capable of transmitting and/or receiving network traffic. The client network application 115 may be a web browser, native application, or other application that can access network resources (e.g., web pages, images, word processing documents, PDF files, movie files, music files, or other computer files) such as over the Internet.

The edge server 120 is situated between the client network application 115 and the publisher origin server 130 and the ad origin server 140. In an embodiment, the edge server 120 is a reverse proxy server. Certain network traffic may be received and processed through the edge server 120. For example, web traffic (e.g., HTTP requests/responses, HTTPS requests/responses, SPDY requests/responses, HTTP/2 requests, responses, etc.) for domains handled by the ad origin server 140 and potentially at the publisher origin server 130 may be received and processed through the edge server 120. In an embodiment, an ad network operator may be a customer of a third party validation of web content service provided at least in part through use of the edge server 120, which is owned/operated by a different entity than the ad network. As will be described in greater detail later herein, the edge server 120 may process online advertisement requests and sign and validate online advertisement creatives on behalf of the ad origin server 140.

The publisher origin server 130 is a computing device that may serve and/or generate network resources (e.g., web pages, images, word processing documents, PDF files movie files, music files, or other computer files). In the example of FIG. 1, the publisher of web pages provided by the publisher origin server 130 may work with the ad network that operates the ad origin server 140 in order to provide advertisements on their network content. The ad origin server 140 is a computing device that may serve advertisements for pages of the publisher origin server, for example.

Although not illustrated in FIG. 1, in one embodiment the edge server 120 is one server of multiple servers or nodes that each may include one or more edge servers, one or more control servers, one or more DNS servers (e.g., one or more authoritative name servers), and one or more other pieces of networking equipment (e.g., one or more routers, switches, hubs, etc.). Each edge server 120 may be part of a data center or a collocation site. In an embodiment, the multiple edge servers are geographically distributed. For example, in some embodiments, the service uses multiple edge nodes that are geographically distributed to decrease the distance between requesting client devices and content. The authoritative name servers may have a same anycast IP address and the edge servers may have a same anycast IP address. As a result, when a DNS request is made, the network transmits the DNS request to the closest authoritative name server (in terms of the routing protocol metrics). That authoritative name server then responds with one or more IP addresses of one or more edge servers within the edge service node. Accordingly, a visitor will be bound to that edge server until the next DNS resolution for the requested hostname (according to the TTL (time to live) value as provided by the authoritative name server). In some embodiments, instead of using an anycast mechanism, embodiments use a geographical load balancer to route traffic to the nearest edge service node. In an embodiment, the edge server 120 receives a request for an online advertisement for a domain handled by the ad origin server 140 as a result of a DNS request for the domain returning an IP address of the edge server 120 instead of the ad origin server 140.

Although not illustrated in FIG. 1, the operations begin with the client network application 115 requesting and receiving a web page either proxied through the edge server 120 or directly from the publisher origin server 130. This web page is sometimes referred herein as the "parent" web page. If proxied, the edge server 120 may receive the request for the web page as a result of a DNS request for the domain of the web page returning an IP address of the edge server 120 instead of an IP address of the publisher origin server 130. This parent web page includes markup for an online advertisement that may specify that the online ad is configured for a fast rendering pipeline as compared to legacy online ads 105 (sometimes referred herein as the "fast path"). As will be described in greater detail, if the online advertisement has been validated as conforming to a set of rules, the ad will be rendered more quickly by the client network application 115 as compared to other online advertisements that have not been validated as conforming to the set of rules. The source of the online advertisement corresponds with a domain of the ad network that operated the ad origin server 140. In an embodiment, this parent web page includes a client-side script (e.g., a JavaScript runtime) that is used by the client network application 115 for the third party validation of web content. For instance, the client-side script may perform the operations described in FIG. 1 with respect to the client network application, including extracting and validating a cryptographic signature for an online advertisement creative. The client-side script may also cause a set of one or more public keys to be downloaded that are to be used when validating the cryptographic signature. The web page also includes other content.

After determining that the online advertisement is configured for fast path rendering, the client network application 115 builds an ad request URL at operation 110. Building the advertisement request URL includes constructing the URL for the ad request. In an embodiment, building the ad request URL may include executing a function with parameters defined by the third party edge server network and/or the ad server network. Optionally, building the ad request URL includes transmitting a request to the publisher origin server 130 to enhance the advertisement (e.g., to add custom targeting information based on their knowledge of the user, such as through cookies), before the ad request is received by the ad network, at operation 112. This request may be sent via an XMLHttpRequest (XHR) cross-origin request (CORS) to the publisher origin server 130. The client-side script may also cause a set of one or more public keys to be downloaded that are to be used when validating the cryptographic signature in operation 110.

After building the ad URL, the client network application 115 transmits a request for the ad to the ad request URL at operation 115, which in this case is received by the edge server 120. In an embodiment, the edge server 120 receives the ad request URL as a result of a DNS request to the ad URL (which is of a domain of the ad origin server 140) returning an IP address of the edge server 120 instead of an IP address of the ad origin server 140.

The edge server 120 retrieves the ad creative at operation 120. In an embodiment, the edge server 120 may send a request for the ad creative to the ad server origin 140 (e.g., using XHR CORS). The ad origin server 140 selects the online advertisement creative for the ad request at operation 125, and responds with the selected ad creative to the edge server 120. In another embodiment, the edge server 120 may determine whether the ad creative is available in the cache 128 associated with the edge server 120. The edge server 120 may be configured to cache certain advertisements that are common or predictable to be selected by the edge server 120. In an embodiment, the selected online advertisement creative to be placed on the parent page is configured for a fast rendering pipeline as compared to legacy online advertisements, if the advertisement creative conforms to a set of one or more rules.

The ad origin server 140 may perform a process to select the advertisement that is to be placed on the parent page, which may be customized or targeted for the user of the client network application. As an example, the ad server may perform an auction to determine which online advertisement is to be placed on the parent network resource. Regardless of the how the ad network selects the advertisement, the selected advertisement creative may be configured for a fast rendering pipeline. In an embodiment, the online advertisement creative may not be configured for a fast rendering pipeline, but the edge server 120 attempts to transform the creative into one that conforms to the set of rules for the fast rendering pipeline.

After receiving the online ad creative, the edge server 120 performs a validation procedure to determine whether the online ad creative conforms to a set of one or more rules at operation 130. The edge server 120 may first determine that the selected creative is to be validated against the set of rules. In an embodiment, this determination includes determining whether the response (from the origin ad server 140) includes a header with a specific value, or a specific value in the HTML, that indicates that validation should occur. If validation is not to occur, then in an embodiment the edge server 120 transmits a response to the client network application 115 with the creative that will be rendered by the client network application 115 in its legacy manner. However, in another embodiment, the edge server 120 may attempt to transform the creative to make it conform to the set of rules (e.g., remove tags that are not allowed, replace tags that are not allowed with other tags that have similar capabilities, change media preferences to conform to the set of rules, change analytics preferences according to the set of rules, etc.).

To perform the validation, the validator 125 of the edge server compares the HTML of the ad creative with a set of one or more rules (e.g., the tags that are allowed in the HTML and/or the tags that are not allowed in the HTML, capabilities that are allowed and/or not allowed in the HTML, extensions that are allowed and/or not allowed, whether the correct client-side script (the client runtime) is included, media preferences (e.g., video and audio must not be enabled for autoplay), and/or analytics preferences (e.g., viewability tracking may be limited to target only the full-ad selector). If the online ad creative conforms to the set of rules, then the validator 125 of the edge server 120 signs the ad creative using a private key available to the edge server 120. The private key is issued to the organization that operates or owns the edge server 120. Any suitable cryptographic digital signature algorithm may be used. After signing the ad creative, the edge server 120 generates a response that includes the online ad creative and the digital signature and sends the ad response to the requesting client network application 115.

It is common for an ad creative to include a reference to an image or other media asset. Prior to sending (and prior to signing the online ad creative in some embodiments), the edge server 120 may alter the online ad creative to improve the rendering and/or caching and delivery of any referenced images or other resources. This may also clean up common HTML mistakes and help with performance and security. For instance, the edge sever may rearrange the order of certain elements, extract layout information, pre-parse the list of extensions used (if any), and/or change the image and resource URLs to point to the edge server (or another edge server in the network).

In an embodiment, in addition to performing the validation, the edge server 120 may pre-fetch all resources referenced by the online ad creative. For instance, in the case of an online ad creative that includes a link to an image to be displayed, the edge server 120 may download the image and store the image in cache 128 (if not already available in cache 128) prior to the client network application 115 actually requesting that image. As a result, when the request for that image is received by the edge server 120, the image is already in cache 128 and available to be returned to the requesting client network application 115 without making another request to the origin server. Thus the image will be able to be returned to the client more quickly than making a request to the origin server. In an embodiment, instead of or in addition to caching the resources by the online ad creative (e.g., the images) and waiting for the client network application 115 to request the resources, the edge server 120 may gather the resources of the online ad creative and push them down to the client network application 115 (e.g., using HTTP/2 Server Push). The edge server 120 may perform full or partial server-side rendering for the online ad creative.

After receiving the online ad creative, the client network application 115 (e.g., via the client-side script) verifies the signature included in the ad response in operation 140. For instance, the client network application 115 extracts the signature and verifies the signature is valid using the set of public keys. If the signature is verified as being valid, then at operation 145 the client network application 115 renders the ad (potentially directly into the parent page). For instance, if the client network application 115 supports Shadow DOM, the online advertisement is spliced into the surrounding HTML document and primarily rendered as a Shadow DOM tree hosted at the element for the online ad. If the client network application 115 does not support Shadow DOM, then the ad may be rendered without delay inside an iframe. If the signature is not verified as being valid, then at operation 150 the online advertisement falls back to its regular advertisement after the usual runtime-determined delay (e.g., in an iframe).

Figure 2:
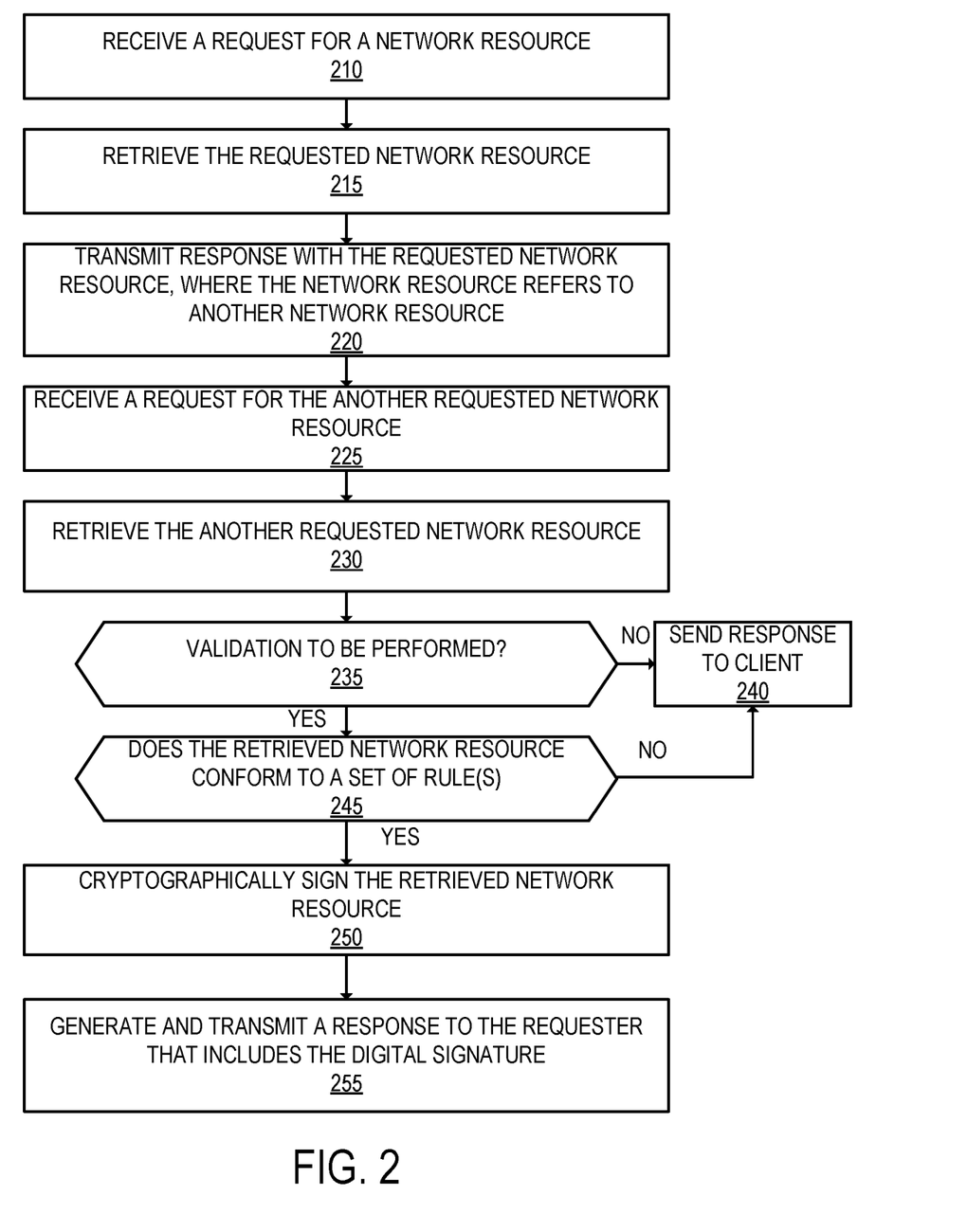
FIG. 2 is a flow diagram illustrating exemplary operations that can be performed in accordance with an embodiment.

FIG. 2 is a flow diagram illustrating exemplary operations that can be performed in accordance with an embodiment. At block 210, a request for a network resource is received at the edge server from the client network application of the client computing device. The request may be a request for an action to be performed on a resource handled by the origin server. The request may be an HTTP or HTTPS request. The request may be received at the edge server as a result of a Domain Name System (DNS) request for the hostname returning an IP address of the edge server instead of the origin server. By way of a specific example, the request may be to download a web page. Flow moves to block 215.

At block 215, the edge server retrieves the requested network resource. In an embodiment, the edge server may send the request towards the origin server and receive a response with the requested network resource from the origin server. In another embodiment, the edge server may determine whether the requested network resource is available in a cache associated with the edge server. If the requested network resource is available in the cache, the edge server can retrieve the cached resource without sending a request to the origin server.

In a specific example, the requested resource may be a web page and may include reference to another network resource. For instance, the web page may include markup for an online advertisement that may specify that the online advertisement is configured for a fast rendering pipeline as compared to legacy online advertisements if the online advertisement creative conforms to a set of one or more rules. The source of the online advertisement is likely located at a different domain than the parent web page. If the online advertisement creative does not conform to the set of rules, then the rendering of the online advertisement may fall back to its regular rendering speed. In an embodiment, this web page may include a client-side script (e.g., a JavaScript runtime) that is used by the client network application for extracting and validating a cryptographic signature included in an advertisement creative (or other specific portion of content) to be placed on the web page, which will be described in greater detail later herein. The client-side script may also cause a set of one or more public keys to be downloaded that are to be used when validating the cryptographic signature. The web page also includes other content. Flow then moves to operation 220.

At operation 220, the edge server transmits a response with the requested network resource to the requesting client network application. As part of rendering the requested network resource, the client network application may transmit a request for the other network resource. Thus, at operation 225, the edge server receives a request from the client network application for another network resource, such as an online advertisement. This request may be an HTTP or HTTPs request, and may request may be received at the edge server as a result of a DNS request for the hostname returning an IP address of the edge server instead of the origin server. For the purposes of this description, the request for the online advertisement may be referred herein as the ad request. The ad request may be sent using XMLHttpRequest (XHR) cross-origin request (CORS). The public keys that are referenced in the network resource may also be downloaded, if not already in the cache of the client network application. For instance, an XHR request may be transmitted to download the public keys. Flow moves to block 230.

At block 230, the edge server retrieves the requested network resource. In an embodiment, the edge server may send the request towards the origin server and receive a response with the requested network resource from the origin server. In another embodiment, the edge server may determine whether the requested network resource is available in a cache associated with the edge server. If the requested network resource is available in the cache, the edge server can retrieve the cached resource without sending a request to the origin server. In the specific example where the requested network resource is an online advertisement, the edge server may transmit a request (e.g., using XHR CORS) to the ad server that will select the online advertisement creative to be placed on the parent network resource. In an embodiment, the online advertisement creative may be configured for a fast rendering pipeline as compared to legacy online advertisements if the online advertisement creative conforms to a set of one or more rules. Flow then moves to block 235.

The origin server, which in the case of an online advertisement is referred herein as an ad server, may perform a procedure to select the advertisement that is to be placed on the parent network resource. For instance, the ad server may perform an auction to determine which online advertisement is to be placed on the parent network resource. The scope of the ad server selecting the online advertisement is outside the scope of this application. Nevertheless, the ad server may select an online advertisement creative that is configured for a fast rendering pipeline, or may select an online advertising creative that is not configured for a fast rending pipeline.

In order for the retrieved network resource to be put on a fast rendering pipeline, the network resource needs to be validated that it conforms to a set of rules, according to an embodiment. At operation 235, the edge server determines whether at least a portion of the content of the retrieved network resource (e.g., the online advertisement creative) is to be validated against a set of one or more rules. In an embodiment, this determination includes determining whether the response (from the origin server) includes a header with a specific value, or a specific value in the HTML, that indicates that validation should occur. If validation is not to occur, then flow moves to operation 240 where the edge server transmit a response to the requesting client network application with the retrieved network resource. The client network application may process the retrieved network resource in its normal fashion. If, however, validation is to occur, then flow moves to operation 245.

At operation 245, the edge server validates whether the retrieved network resource conforms to a set of one or more rules. By way of example, in the case where the retrieved network resource is an online advertisement, the set of rules may be defined so that the online advertisement can be rendered quickly by the client network application without degrading user experience. By way of example, the set of rules may specify one or more of the following: the tags that are allowed in the HTML and/or the tags that are not allowed in the HTML, capabilities that are allowed and/or not allowed in the HTML, extensions that are allowed and/or not allowed, whether the correct client-side script (the client runtime) is included, media preferences (e.g., video and audio must not be enabled for autoplay), and analytics preferences (e.g., viewability tracking may be limited to target only the full-ad selector). Of course these rules are examples and different rules may be used. If the network resource does not conform to the set of rules, then flow moves back to operation 240 where the edge server transmits a response to the requesting client network application with the retrieved network resource. If, however, the network resource conforms to the set of rules, then flow moves to operation 250.

At operation 250, the edge server cryptographically signs the retrieved network resource thereby creating a digital signature. The edge server uses a private key when signing the retrieved network resource that can be verified with one of the public keys downloaded by the client network application. Any suitable cryptographic digital signature algorithm may be used to sign the retrieved network resource. Flow then moves to operation 255.

At operation 255, the edge server generates and transmits a response to the requesting client network application with the retrieved network resource and the digital signature. The client network application is configured to verify the digital signature with the set of public keys, and if verified, render the retrieved network resource without delay. If the digital signature is not included or could not be verified, then the client network application may take other actions such as rendering the network resource in its normal path.

In an embodiment, in addition to performing the validation, the edge server may alter the network resource to improve the rendering and/or caching and delivery of any referenced images or other resources. For instance, the edge sever may rearrange the order of certain elements, extract layout information, pre-parse the list of extensions used (if any), and/or change the image and resource URLs to point to the edge server (or another edge server in the network). The network resource may be altered after determining that validation is to be done but prior to the validation being performed, in an embodiment.

In an embodiment, in addition to performing the validation, the edge server may pre-fetch all resources referenced by the network resource in which validation is being performed. For instance, in the case of an online advertisement creative that includes a link to an image to be displayed, the edge server may download the image and store the image in cache (if not already available in cache) prior to the client network application actually requesting that image. As a result, when the request for that image is received by the edge server, the image is already in cache and available to be returned to the requesting client network application without making another request to the origin server. Thus the image will be able to be returned to the client more quickly than making a request to the origin server.

Although FIG. 2 is described with respect to online advertisements, the operations may be similarly performed for other types of network resources. For instance, one rule may be to analyze the network resource for known issues such as if it has been hacked and/or contains malware or other malicious content. The edge server may validate whether the network resource conforms to the rule and cryptographically sign the network resource if it is conforming. The edge server may include the resulting digital signature and the network resource in the response to the client network application. The client network application may use validate whether the digital signature is valid and if so may take certain actions. For instance, the client network application may be configured to process or display only those network resources that have been deemed to conform to the set of rules. For those that do not conform to the set of rules, the client network application may present an error message that indicates that the network resource has not been verified and may be hacked and/or contain malware or other malicious content, with an option for the user to proceed anyway. The client network application may be configured to display a notification or other indicator (e.g., a checkmark) that indicates that the network resource has been determined not to be hacked and/or contain malware.

As another example, one rule may be to analyze the network resource for adult content or other content not appropriate for children. The edge server may validate whether the network resource conforms to the rule and cryptographically sign the network resource if it is conforming. The edge server may include the resulting digital signature and the network resource in the response to the client network application. The client network application may use validate whether the digital signature is valid and if so may take certain actions. For instance, the client network application may be configured to process or display only those network resources that have been deemed to conform to the set of rules. For those that do not conform to the set of rules, the client network application may present an error message that indicates that the network resource may not be suitable for children. The client network application may be configured to display a notification or other indicator (e.g., a checkmark) that indicates that the network resource has been determined to be suitable for children.

Figure 3:
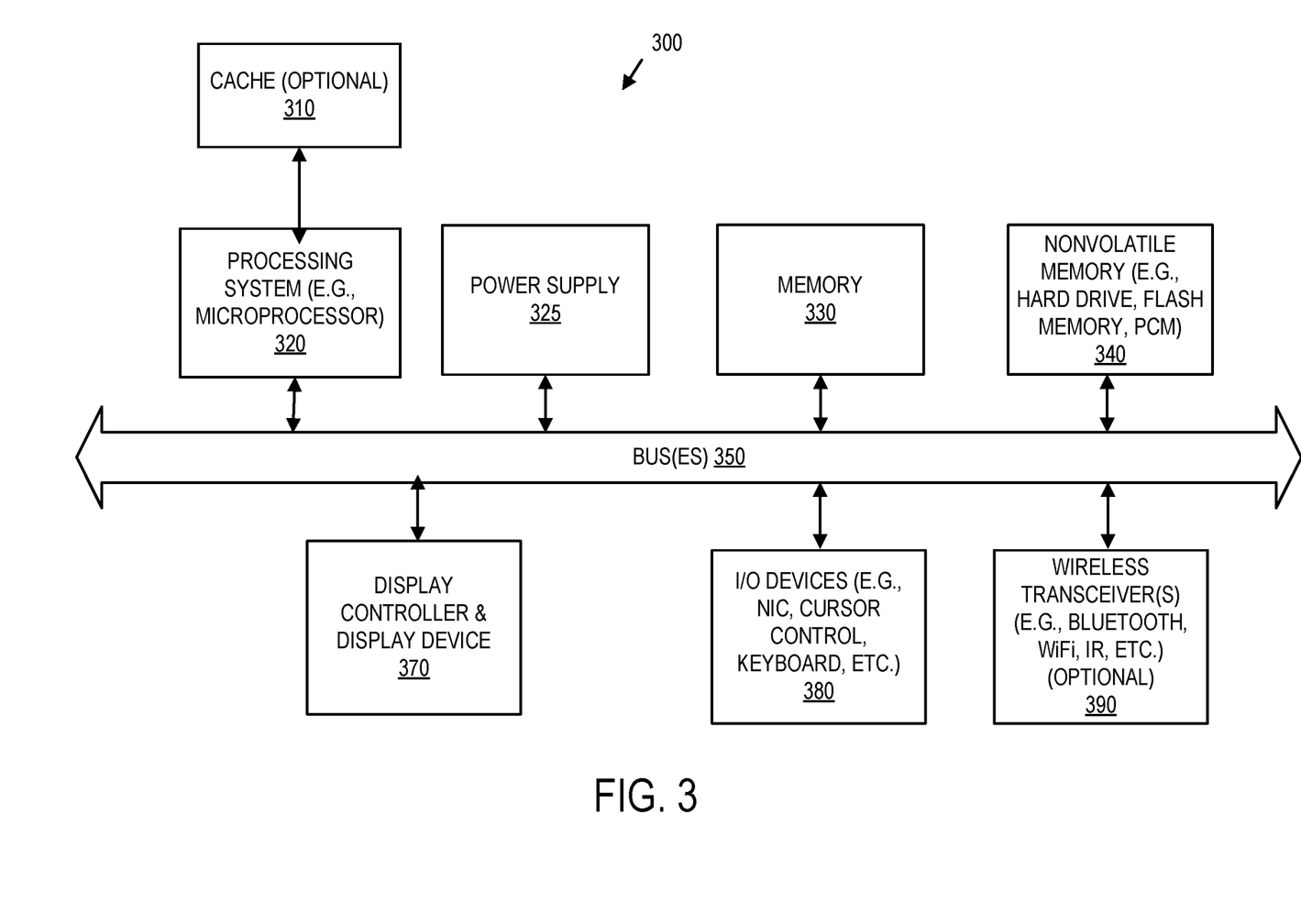
FIG. 3 is a block diagram illustrating a data processing system that can be used in an embodiment.

As illustrated in FIG. 3, the computer system 300, which is a form of a data processing system, includes the bus(es) 350 which is coupled with the processing system 320, power supply 325, memory 330, and the nonvolatile memory 340 (e.g., a hard drive, flash memory, Phase-Change Memory (PCM), etc.). The bus(es) 350 may be connected to each other through various bridges, controllers, and/or adapters as is well known in the art. The processing system 320 may retrieve instruction(s) from the memory 330 and/or the nonvolatile memory 340, and execute the instructions to perform operations described herein. The bus 350 interconnects the above components together and also interconnects those components to the display controller & display device 370, Input/Output devices 380 (e.g., NIC (Network Interface Card), a cursor control (e.g., mouse, touchscreen, touchpad, etc.), a keyboard, etc.), and the optional wireless transceiver(s) 390 (e.g., Bluetooth, WiFi, Infrared, etc.). In one embodiment, the client device, caching system, and/or service device described herein may take the form of the computer system 300.

The techniques shown in the figures can be implemented using code and data stored and executed on one or more computing devices (e.g., client device, edge server, origin server, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a first server, comprising:
receiving, from a client network application, a first request for a first network resource;
retrieving the requested first network resource, wherein the requested first network resource is handled by a second server that is different than the first server;
validating whether at least a portion of the retrieved first network resource conforms to a set of one or more rules;
responsive to determining that the at least the portion of the retrieved first network resource conforms to the set of one or more rules, cryptographically signing the at least the portion of the retrieved first network resource thereby creating a digital signature;
transmitting a first response to the client network application that includes the at least the portion of the retrieved first network resource and the digital signature;
determining that the requested first network resource includes a reference to a second network resource;
retrieving the second network resource;
storing the retrieved second network resource in cache available to the first server;
receiving, from the client network application, a second request for the second network resource, wherein the second request for the second network resource is received after the step of retrieving the second network resource;
retrieving the second network resource from the cache available to the first server; and
transmitting a second response to the client network application that includes at least the retrieved second network resource.

2. The method of claim 1, wherein the first network resource is an online advertisement, and wherein the at least the portion of the retrieved first network resource to be validated includes HTML of the at least the portion of the retrieved first network resource.

3. The method of claim 1, further comprising:
determining that the retrieved first network resource includes the at least the portion of the retrieved first network resource is to be validated against the set of one or more rules including determining whether a specific header that indicates validation is to be performed against the set of one or more rules is included in a response having the first network resource.

4. The method of claim 1, further comprising:
determining that the requested first network resource includes a reference to a third network resource;
retrieving the third network resource; and
transmitting the retrieved third network resource to the client network application regardless of whether the client network application requests the third network resource.

5. The method of claim 1, wherein prior to validating whether at least the portion of the retrieved first network resource conforms to a set of one or more rules, performing a set of one or more transformations on HTML of the first network resource.

6. A non-transitory machine-readable storage medium that provides instructions that, when executed by a processor of a first server, cause said processor to perform operations comprising:
receiving, from a client network application, a first request for a first network resource;
retrieving the requested first network resource, wherein the requested first network resource is handled by a second server that is different than the first server;
validating whether at least a portion of the retrieved first network resource conforms to a set of one or more rules;
responsive to determining that the at least the portion of the retrieved first network resource conforms to the set of one or more rules, cryptographically signing the at least the portion of the retrieved first network resource thereby creating a digital signature;
transmitting a first response to the client network application that includes the at least the portion of the retrieved first network resource and the digital signature;
determining that the requested first network resource includes a reference to a second network resource;
retrieving the second network resource;
storing the retrieved second network resource in cache available to the first server;
receiving, from the client network application, a second request for the second network resource, wherein the second request for the second network resource is received after the step of retrieving the second network resource;
retrieving the second network resource from the cache available to the first server; and
transmitting a second response to the client network application that includes at least the retrieved second network resource.

7. The non-transitory machine-readable storage medium of claim 6, wherein the first network resource is an online advertisement, and wherein the at least the portion of the retrieved first network resource to be validated includes HTML of the at least the portion of the retrieved first network resource.

8. The non-transitory machine-readable storage medium of claim 6, wherein the non-transitory machine-readable storage medium further provides instructions that, when executed by the processor of the first server, cause said processor to perform operations comprising:
determining that the retrieved first network resource includes the at least the portion of the retrieved first network resource is to be validated against the set of one or more rules including determining whether a specific header that indicates validation is to be performed against the set of one or more rules is included in a response having the first network resource.

9. The non-transitory machine-readable storage medium of claim 6, wherein the non-transitory machine-readable storage medium further provides instructions that, when executed by the processor of the first server, cause said processor to further perform operations comprising:
determining that the requested first network resource includes a reference to a third network resource;
retrieving the third network resource; and
transmitting the retrieved third network resource to the client network application regardless of whether the client network application requests the third network resource.

10. The non-transitory machine-readable storage medium of claim 6, wherein prior to validating whether at least the portion of the retrieved first network resource conforms to a set of one or more rules, performing a set of one or more transformations on HTML of the first network resource.

11. An apparatus, comprising:
a first server including a processor and a non-transitory machine-readable storage medium coupled with the processor that stores instructions that, when executed by the processor, cause said processor to perform the following:
receive, from a client network application, a first request for a first network resource;
retrieve the requested first network resource, wherein the requested first network resource is handled by a second server that is different than the first server;
validate whether at least a portion of the retrieved first network resource conforms to a set of one or more rules;
responsive to a determination that the at least the portion of the retrieved first network resource conforms to the set of one or more rules, cryptographically sign the at least the portion of the retrieved first network resource thereby creating a digital signature;
transmit a first response to the client network application that includes the at least the portion of the retrieved first network resource and the digital signature;
determine that the requested first network resource includes a reference to a second network resource;
retrieve the second network resource;
store the retrieved second network resource in cache available to the first server;
receive, from the client network application, a second request for the second network resource, wherein the second request for the second network resource is to be received after the second network resource is retrieved;
retrieve the second network resource from the cache available to the first server; and
transmit a second response to the client network application that includes at least the retrieved second network resource.

12. The apparatus of claim 11, wherein the first network resource is an online advertisement, and wherein the at least the portion of the retrieved first network resource to be validated includes HTML of the at least the portion of the retrieved first network resource.

13. The apparatus of claim 11, wherein the non-transitory machine-readable storage medium further provides instructions that, when executed by the processor of the first server, cause said processor to further perform operations comprising:
determine that the retrieved first network resource includes the at least the portion of the retrieved first network resource is to be validated against the set of one or more rules includes a determination whether a specific header that indicates validation is to be performed against the set of one or more rules is included in a response having the first network resource.

14. The apparatus of claim 11, wherein the non-transitory machine-readable storage medium further provides instructions that, when executed by the processor of the first server, cause said processor to further perform operations comprising:
determine that the requested first network resource includes a reference to a third network resource;
retrieve the third network resource; and
transmit the retrieved third network resource to the client network application regardless of whether the client network application requests the third network resource.

15. The apparatus of claim 11, wherein prior to validation of whether at least the portion of the retrieved first network resource conforms to a set of one or more rules, perform a set of one or more transformations on HTML of the first network resource.

* * * * *